United States Patent
Iwai et al.

(10) Patent No.: US 9,919,763 B2
(45) Date of Patent: Mar. 20, 2018

(54) BICYCLE SPROCKET

(71) Applicant: SHIMANO INC., Sakai (JP)

(72) Inventors: Tooru Iwai, Sakai (JP); Makoto Souwa, Sakai (JP)

(73) Assignee: SHIMANO INC., Sakai (JP)

( * ) Notice: Subject to any disclaimer, the term of this patent is extended or adjusted under 35 U.S.C. 154(b) by 673 days.

(21) Appl. No.: 14/306,167

(22) Filed: Jun. 16, 2014

(65) Prior Publication Data

US 2015/0360749 A1    Dec. 17, 2015

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .................................. B62M 9/10; F16H 55/30
See application file for complete search history.

(56) References Cited

U.S. PATENT DOCUMENTS

| | | | | |
|---|---|---|---|---|
| 4,522,611 A * | 6/1985 | Hiatt | ...................... | F16H 55/30 474/152 |
| 8,905,878 B2 * | 12/2014 | Loy | ...................... | B62M 9/10 474/160 |
| 9,033,835 B2 * | 5/2015 | Blank | ...................... | B62M 9/10 474/152 |
| 9,150,280 B2 * | 10/2015 | Braedt | ...................... | B62M 9/10 |
| 9,415,835 B2 * | 8/2016 | Tokuyama | ............... | B62M 9/12 |
| 9,440,706 B2 * | 9/2016 | Iwai | ...................... | B62M 9/105 |
| 2003/0073531 A1 * | 4/2003 | Tseng | ...................... | B62M 9/105 474/160 |
| 2005/0090349 A1 * | 4/2005 | Lee | ...................... | B62M 9/105 474/160 |
| 2006/0258498 A1 * | 11/2006 | Tabe | ...................... | B62M 9/105 474/160 |
| 2008/0176691 A1 * | 7/2008 | Saifuddin | ............. | B62M 9/105 474/160 |
| 2010/0009794 A1 * | 1/2010 | Chiang | .................... | B62M 9/10 474/160 |
| 2010/0075791 A1 | 3/2010 | Braedt | | |
| 2011/0319209 A1 * | 12/2011 | Huang | .................... | B21K 1/28 474/164 |

(Continued)

FOREIGN PATENT DOCUMENTS

TW          1329088 B      8/2010

*Primary Examiner* — William E Dondero
*Assistant Examiner* — Mark K Buse
(74) *Attorney, Agent, or Firm* — Mori & Ward, LLP

(57) ABSTRACT

A bicycle sprocket comprises a first member and a second member. The first member comprises a plurality of first teeth and a first body. The first body includes a plurality of first arms arranged in a circumferential direction of the bicycle sprocket. The second member comprises a plurality of second teeth and a second body. The second body includes a plurality of second arms arranged in the circumferential direction. The second member is configured to be attached to the first member so that an interior cavity is provided between the first member and the second member. The interior cavity is at least partially provided between at least one of the first arms and at least one of the second arms facing the at least one of the first arms in a state where the second member is attached to the first member.

30 Claims, 15 Drawing Sheets

(56) References Cited

U.S. PATENT DOCUMENTS

| | | | |
|---|---|---|---|
| 2012/0196711 A1* | 8/2012 | Loy | B62M 9/10 |
| | | | 474/160 |
| 2012/0222926 A1* | 9/2012 | Iwai | F16D 65/123 |
| | | | 188/218 XL |
| 2012/0244978 A1* | 9/2012 | Liao | B62M 9/10 |
| | | | 474/160 |
| 2013/0087012 A1* | 4/2013 | Sugimoto | B62M 9/105 |
| | | | 74/594.2 |
| 2015/0362057 A1* | 12/2015 | Wesling | F16H 55/06 |
| | | | 474/152 |
| 2016/0339995 A1* | 11/2016 | Sugimoto | B62M 9/105 |

* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket comprises a first member and a second member. The first member comprises a plurality of first teeth and a first body. The first body includes a plurality of first arms arranged in a circumferential direction of the bicycle sprocket. The second member comprises a plurality of second teeth and a second body. The second body includes a plurality of second arms arranged in the circumferential direction. The second member is configured to be attached to the first member so that an interior cavity is provided between the first member and the second member. The interior cavity is at least partially provided between at least one of the first arms and at least one of the second arms facing the at least one of the first arms in a state where the second member is attached to the first member.

In accordance with a second aspect of the present invention, the bicycle sprocket according to the first aspect is configured so that the first body including a first outer peripheral part. The plurality of first teeth radially outwardly protrudes from the first outer peripheral part of the first body. The second body includes a second outer peripheral part. The plurality of second teeth radially outwardly protrudes from the second outer peripheral part of the second body. The second body faces the first body and spaced apart from the first body in an axial direction parallel to a rotational axis of the bicycle sprocket.

In accordance with a third aspect of the present invention, the bicycle sprocket according to the second aspect is configured so that the first member includes at least one first wall extending from the first body in the axial direction. The second member includes at least one second wall extending from the second body in the axial direction. The at least one first wall faces the at least one second wall in the state where the second member is attached to the first member.

In accordance with a fourth aspect of the present invention, the bicycle sprocket according to the third aspect is configured so that the at least one first wall faces the at least one second wall in a direction parallel to a virtual plane perpendicular to the rotational axis in the state where the second member is attached to the first member.

In accordance with a fifth aspect of the present invention, the bicycle sprocket according to the third aspect is configured so that the at least one first wall faces the at least one second wall in the axial direction in the state where the second member is attached to the first member.

In accordance with a sixth aspect of the present invention, the bicycle sprocket according to the third aspect is configured so that the at least one first wall is attached to the at least one second wall to couple the first member to the second member.

In accordance with a seventh aspect of the present invention, the bicycle sprocket according to the second aspect is configured so that the first member includes at least one first wall extending from the first body in the axial direction. The at least one first wall faces the second body in the axial direction in the state where the second member is attached to the first member.

In accordance with an eighth aspect of the present invention, the bicycle sprocket according to the seventh aspect is configured so that the at least one first wall is attached to the second body to couple the first member to the second member.

In accordance with a ninth aspect of the present invention, the bicycle sprocket according to the second aspect is configured so that the second member includes at least one second wall extending from the second body in the axial direction. The at least one second wall faces the first body in the axial direction in the state where the second member is attached to the first member.

In accordance with a tenth aspect of the present invention, the bicycle sprocket according to the ninth aspect is configured so that the at least one second wall is attached to the first body to couple the first member to the second member.

In accordance with an eleventh aspect of the present invention, the bicycle sprocket according to the first aspect is configured so that the plurality of first teeth is integrally provided with the first body as a single unitary member.

In accordance with a twelfth aspect of the present invention, the bicycle sprocket according to the first aspect is configured so that the plurality of second teeth is integrally provided with the second body as a single unitary member.

In accordance with a thirteenth aspect of the present invention, the bicycle sprocket according to the first aspect is configured so that the plurality of first teeth is separate from the first body and attached to the first body.

In accordance with a fourteenth aspect of the present invention, the bicycle sprocket according to the first aspect is configured so that the plurality of second teeth is separate from the second body and attached to the second body.

In accordance with a fifteenth aspect of the present invention, the bicycle sprocket according to the first aspect is configured so that the plurality of first teeth has a multi-layered structure. The plurality of first teeth includes a first layer, a second layer, and a third layer. The first layer is made of a first metallic material having a first density. The second layer is made of a second metallic material having a second density. The third layer is made of a third metallic material having a third density. The second layer is provided between the first layer and the third layer. The second density is lower than the first density and the third density.

In accordance with a sixteenth aspect of the present invention, the bicycle sprocket according to the first aspect is configured so that the plurality of second teeth has a multi-layered structure. The plurality of second teeth includes a fourth layer, a fifth layer, and a sixth layer. The fourth layer is made of a fourth metallic material having a fourth density. The fifth layer is made of a fifth metallic material having a fifth density. The sixth layer is made of a sixth metallic material having a sixth density. The fifth layer is provided between the fourth layer and the sixth layer. The fifth density is lower than the fourth density and the sixth density.

In accordance with a seventeenth aspect of the present invention, the bicycle sprocket according to the first aspect further comprises a hub mounting structure configured to engage with a bicycle hub assembly. At least one of the first member and the second member is provided on the hub mounting structure.

In accordance with an eighteenth aspect of the present invention, the bicycle sprocket according to the seventeenth aspect is configured so that the hub mounting structure is integrally provided with the at least one of the first member and the second member.

In accordance with a nineteenth aspect of the present invention, the bicycle sprocket according to the seventeenth aspect is configured so that the hub mounting structure is separate from the at least one of the first member and the second member and is attached to the at least one of the first member and the second member.

In accordance with a twentieth aspect of the present invention, the bicycle sprocket according to the first aspect is configured so that the second member is attached to the first member by diffusion bonding.

In accordance with a twenty-first aspect of the present invention, the bicycle sprocket according to the first aspect is configured so that the second member is attached to the first member by adhesive.

In accordance with a twenty-second aspect of the present invention, the bicycle sprocket according to the first aspect is configured so that the plurality of first teeth is attached to the first body by diffusion bonding.

In accordance with a twenty-third aspect of the present invention, the bicycle sprocket according to the first aspect is configured so that the plurality of second teeth is attached to the second body by diffusion bonding.

In accordance with a twenty-fourth aspect of the present invention, the bicycle sprocket according to the first aspect is configured so that the plurality of first teeth is attached to the first body by adhesive.

In accordance with a twenty-fifth aspect of the present invention, the bicycle sprocket according to the first aspect is configured so that the plurality of second teeth is attached to the second body by adhesive.

In accordance with a twenty-sixth aspect of the present invention, the bicycle sprocket according to the first aspect is configured so that the first member includes first openings provided between the first arms in the circumferential direction. The second member includes second openings provided between the second arms in the circumferential direction.

In accordance with a twenty-seventh aspect of the present invention, the bicycle sprocket according to the twenty-sixth aspect is configured so that the first openings are respectively aligned with the second openings in the axial direction in the state where the second member is attached to the first member.

In accordance with a twenty-eighth aspect of the present invention, the bicycle sprocket according to the first aspect is configured so that at least one of the plurality of first teeth and the plurality of second teeth is made of one of iron, aluminum, and titanium.

In accordance with a twenty-ninth aspect of the present invention, the bicycle sprocket according to the first aspect is configured so that at least one of the first body and the second body is made of aluminum.

In accordance with a thirtieth aspect of the present invention, the bicycle sprocket according to the first aspect is configured so that the interior cavity is at least partially provided between each of the first arms and each of the second arms in the state where the second member is attached to the first member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
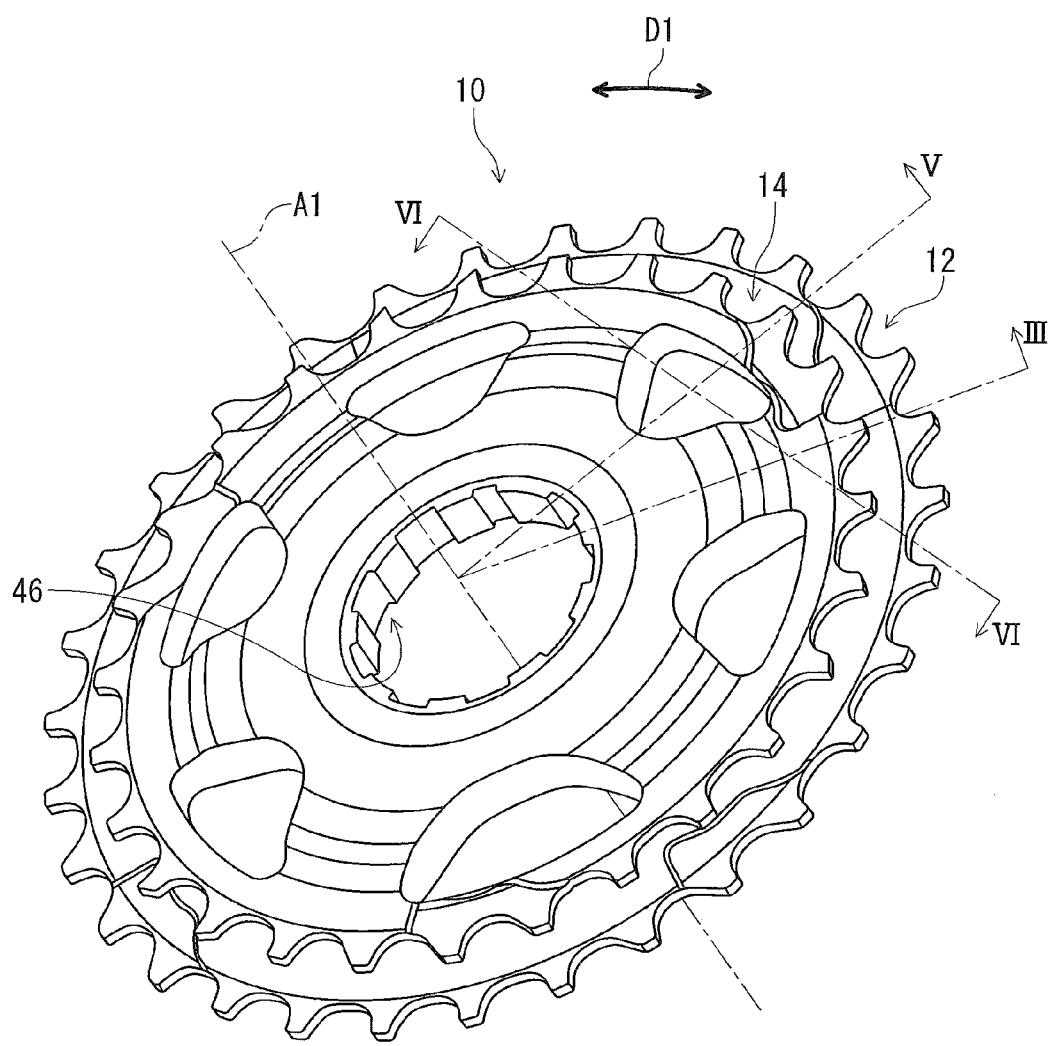
FIG. 1 is a perspective view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with the first embodiment is rotatable about a rotational axis A1 in a circumferential direction D1. The bicycle sprocket 10 comprises a first member 12 and a second member 14. In the illustrated embodiment, the bicycle sprocket 10 is a rear sprocket configured to be mounted on a bicycle hub assembly (not shown). However, structures of the bicycle sprocket 10 can be applied to a front sprocket if needed and/or desired.

Figure 2:
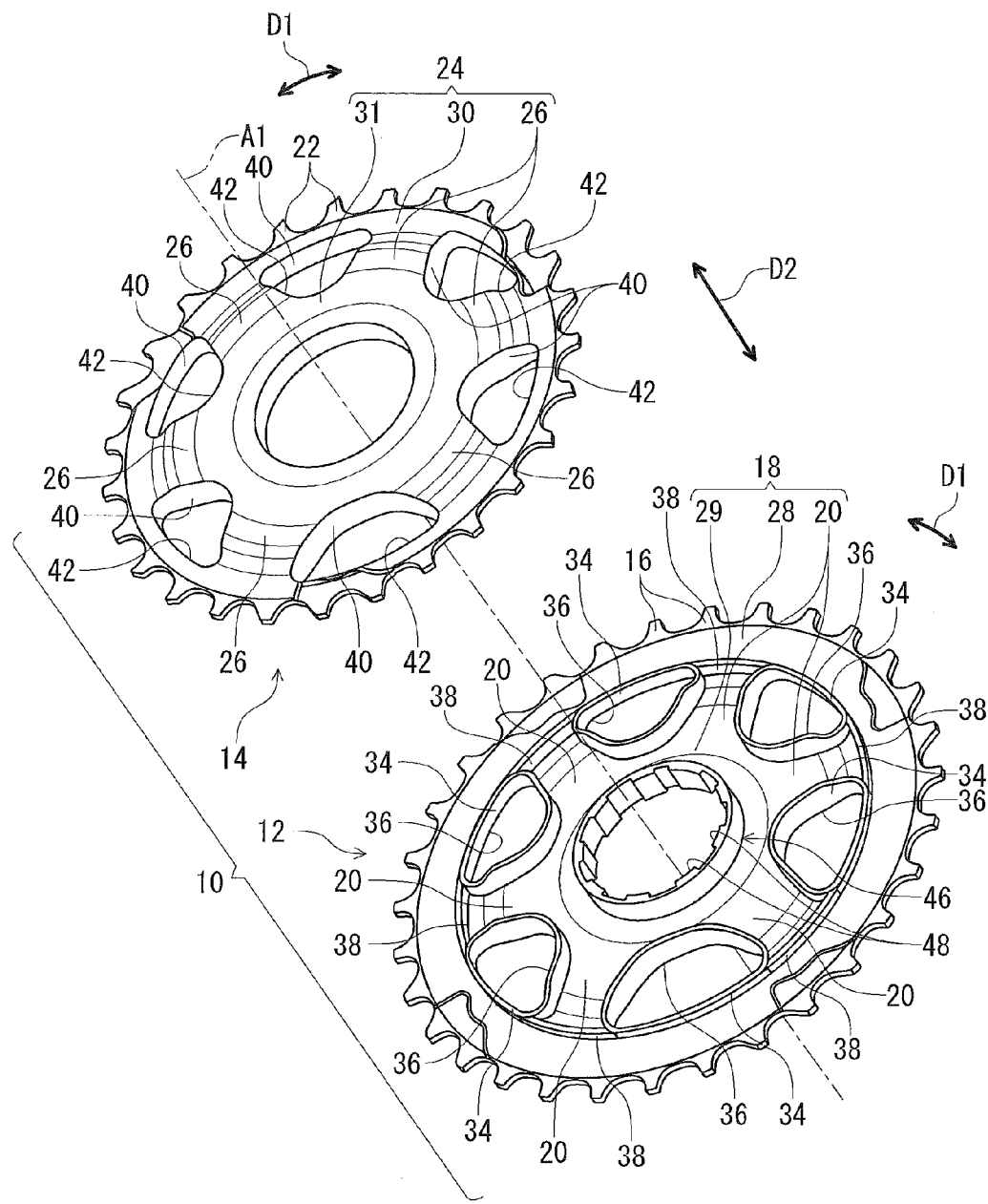
FIG. 2 is an exploded perspective view of the bicycle sprocket illustrated in FIG. 1.

As seen in FIG. 2, the first member 12 and the second member 14 are separate members from each other. The first member 12 comprises a plurality of first teeth 16 and a first body 18. The first body 18 includes a plurality of first arms 20 arranged in the circumferential direction D1 of the bicycle sprocket 10. The second member 14 comprises a plurality of second teeth 22 and a second body 24. The second body 24 includes a plurality of second arms 26 arranged in the circumferential direction D1. In the illustrated embodiment, a total number of the first teeth 16 is greater than a total number of the second teeth 22.

As seen in FIG. 2, the first body 18 includes a first outer peripheral part 28 and a first inner peripheral part 29. For example, each of the first outer peripheral part 28 and the first inner peripheral part 29 has an annular shape. The plurality of first teeth 16 radially outwardly protrudes from the first outer peripheral part 28 of the first body 18. The first outer peripheral part 28 is coupled to the first inner peripheral part 29 by the first arms 20. The first arms 20 extends in a radial direction of the bicycle sprocket 10 between the first outer peripheral part 28 and the first inner peripheral part 29.

The second body 24 includes a second outer peripheral part 30 and a second inner peripheral part 31. For example, each of the second outer peripheral part 30 and the second inner peripheral part 31 has an annular shape. The plurality of second teeth 22 radially outwardly protrudes from the second outer peripheral part 30 of the second body 24. The second outer peripheral part 30 is coupled to the second inner peripheral part 31 by the second arms 26. The second arms 26 extends in the radial direction between the second outer peripheral part 30 and the second inner peripheral part 31.

Figure 3:
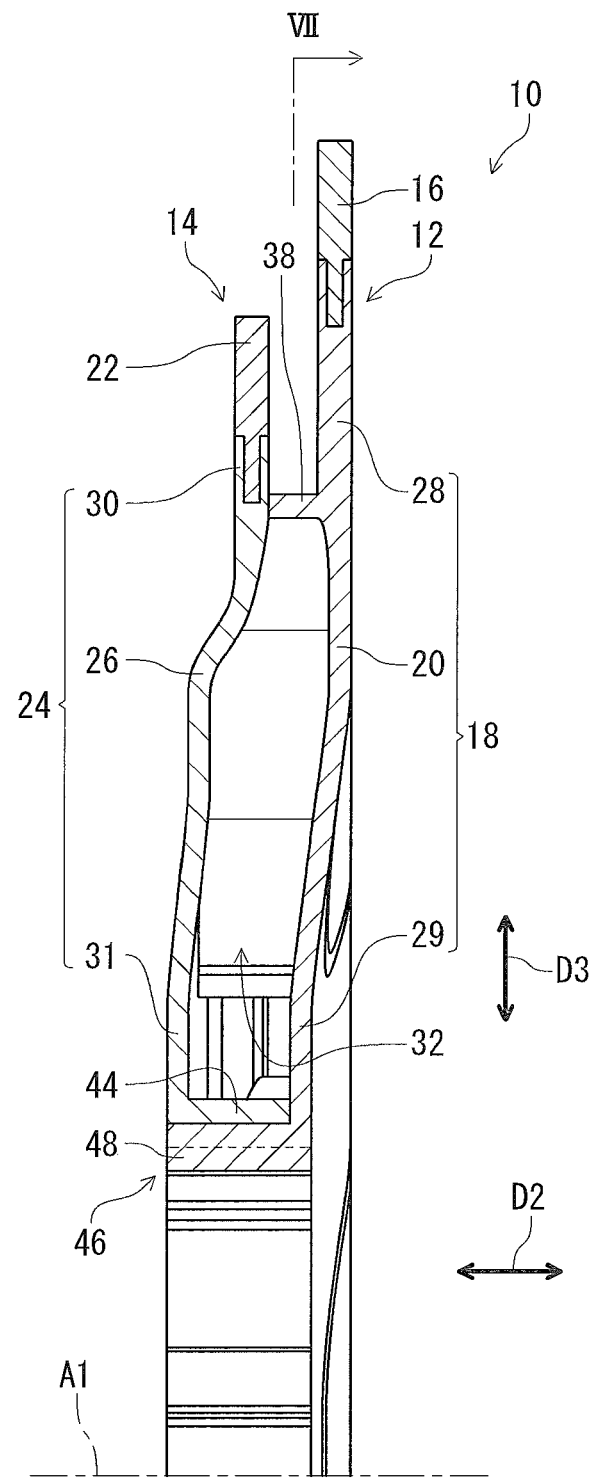
FIG. 3 is a cross-sectional view of the bicycle sprocket taken along line III of FIG. 1.

As seen in FIG. 3, the second body 24 faces the first body 18 and is spaced apart from the first body 18 in an axial direction D2 parallel to the rotational axis A1 of the bicycle sprocket 10. The second member 14 is configured to be attached to the first member 12 so that an interior cavity 32 is provided between the first member 12 and the second member 14. The interior cavity 32 is at least partially provided between each of the first arms 20 and each of the second arms 26 in a state where the second member 14 is attached to the first member 12.

In the illustrated embodiment, the interior cavity 32 is partially provided between each of the first arms 20 and each of the second arms 26 in the state where the second member 14 is attached to the first member 12. Furthermore, the interior cavity 32 is partially provided between the first inner peripheral part 29 and the second inner peripheral part 31 in the state where the second member 14 is attached to the first member 12. The interior cavity 32 can, however, be at least partially provided between at least one of the first arms 20 and at least one of the second arms 26 facing the at least one of the first arms 20 in the state where the second member 14 is attached to the first member 12.

As seen in FIG. 2, the first member 12 includes at least one first wall 34 extending from the first body 18 in the axial direction D2. In the illustrated embodiment, the first member 12 includes first walls 34 extending from the first body 18 in the axial direction D2 toward the second body 24 of the second member 14. Each of the first walls 34 have an annular shape. The first member 12 includes first openings 36 provided between the first arms 20 in the circumferential direction D1. The first openings 36 are respectively defined by the first walls 34. The shapes of the first walls 34 and the first openings 36 are not limited to the illustrated embodiment.

The first member 12 includes first additional walls 38. The first additional walls 38 extend from the first body 18 in the axial direction D2 toward the second body 24 of the second member 14. Each of the first additional walls 38 extends between adjacent two of the first walls 34 in the circumferential direction D1.

Figure 4:
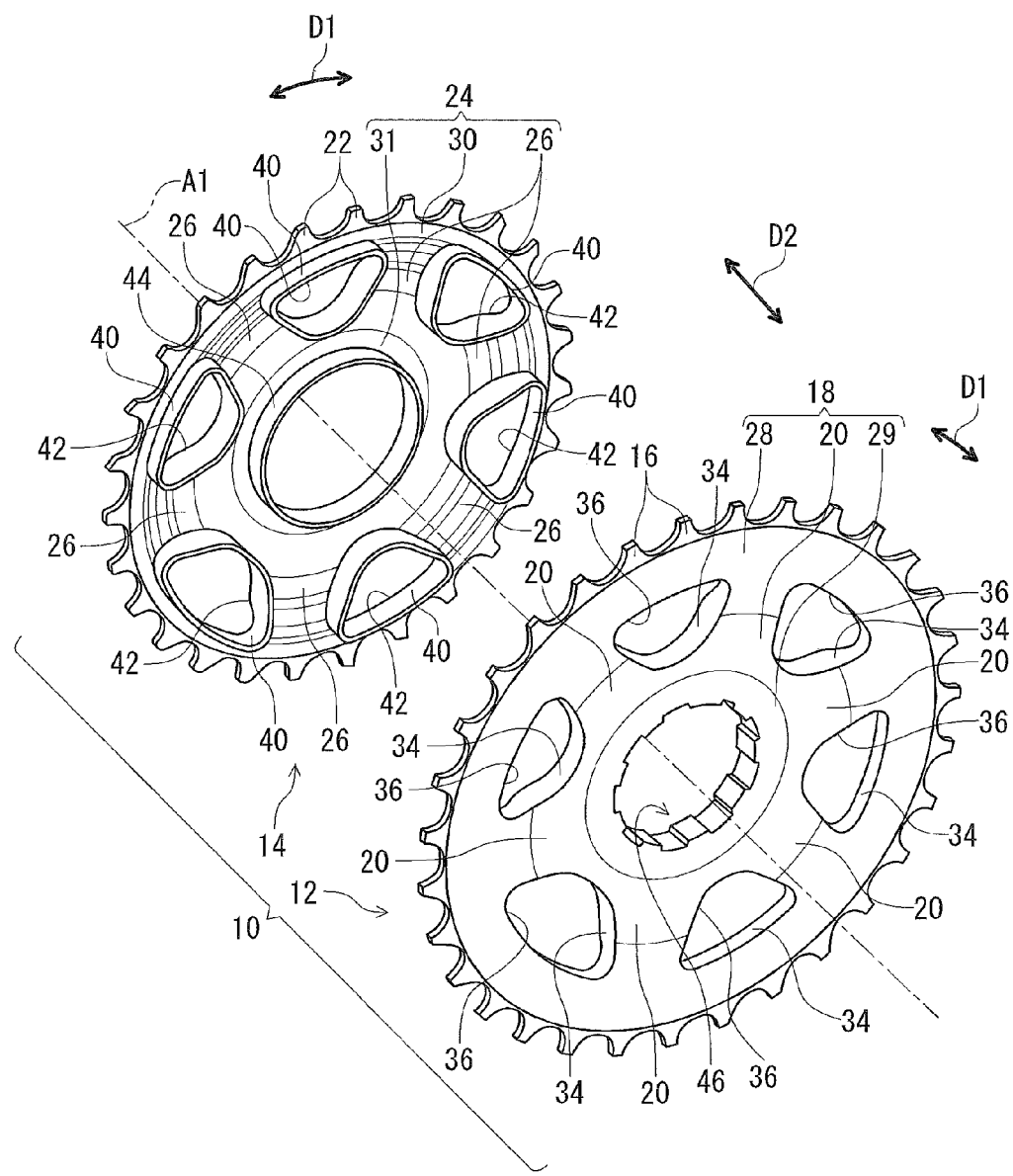
FIG. 4 is an exploded perspective view of the bicycle sprocket illustrated in FIG. 1.

As seen in FIG. 4, the second member 14 includes at least one second wall 40 extending from the second body 24 in the axial direction D2. In the illustrated embodiment, the second member 14 includes second walls 40 extending from the second body 24 in the axial direction D2 toward the first body 18 of the first member 12. Each of the second walls 40 have an annular shape. The second member 14 includes second openings 42 provided between the second arms 26 in the circumferential direction D1. The second openings 42 are respectively defined by the second walls 40. The shapes of the second walls 40 and the second openings 42 are not limited to the illustrated embodiment.

The second member 14 includes a second additional wall 44. The second additional wall 44 extends from the second body 24 in the axial direction D2 toward the first body 18 of the first member 12. The second additional wall 44 has an annular shape.

Figure 5:
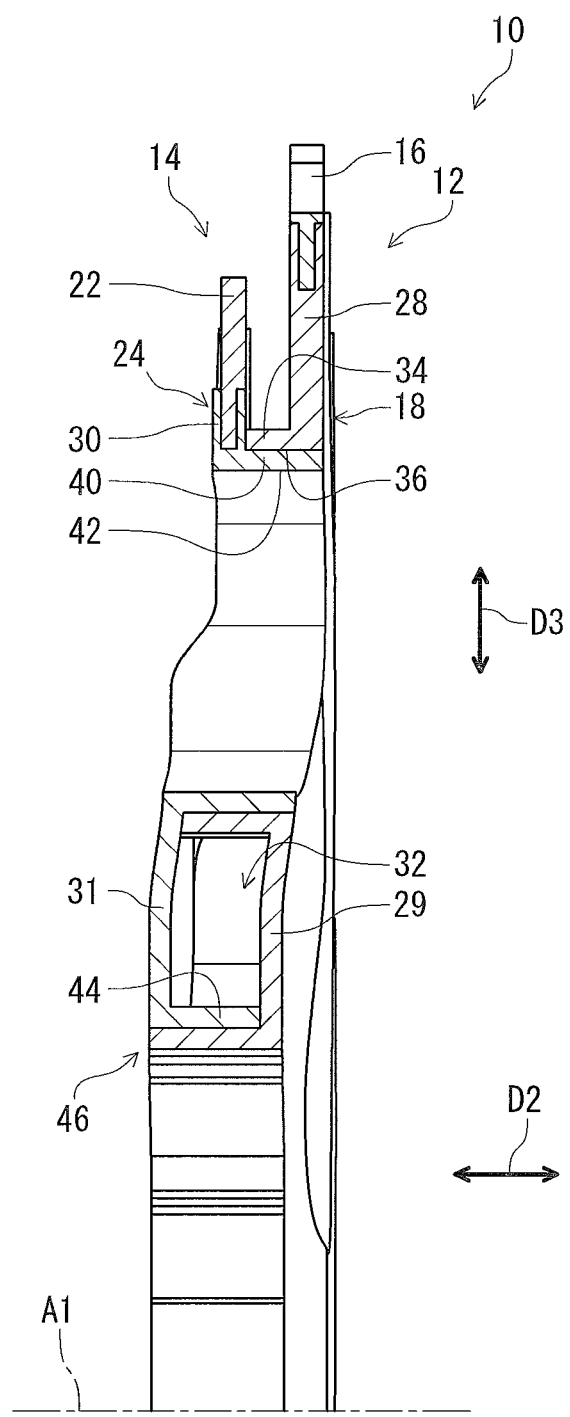
FIG. 5 is a cross-sectional view of the bicycle sprocket taken along line V of FIG. 1.

As seen in FIG. 5, the first openings 36 are respectively aligned with the second openings 42 in the axial direction D2 in the state where the second member 14 is attached to the first member 12. In the illustrated embodiment, the second openings 42 are respectively provided in the first openings 36.

Figure 6:
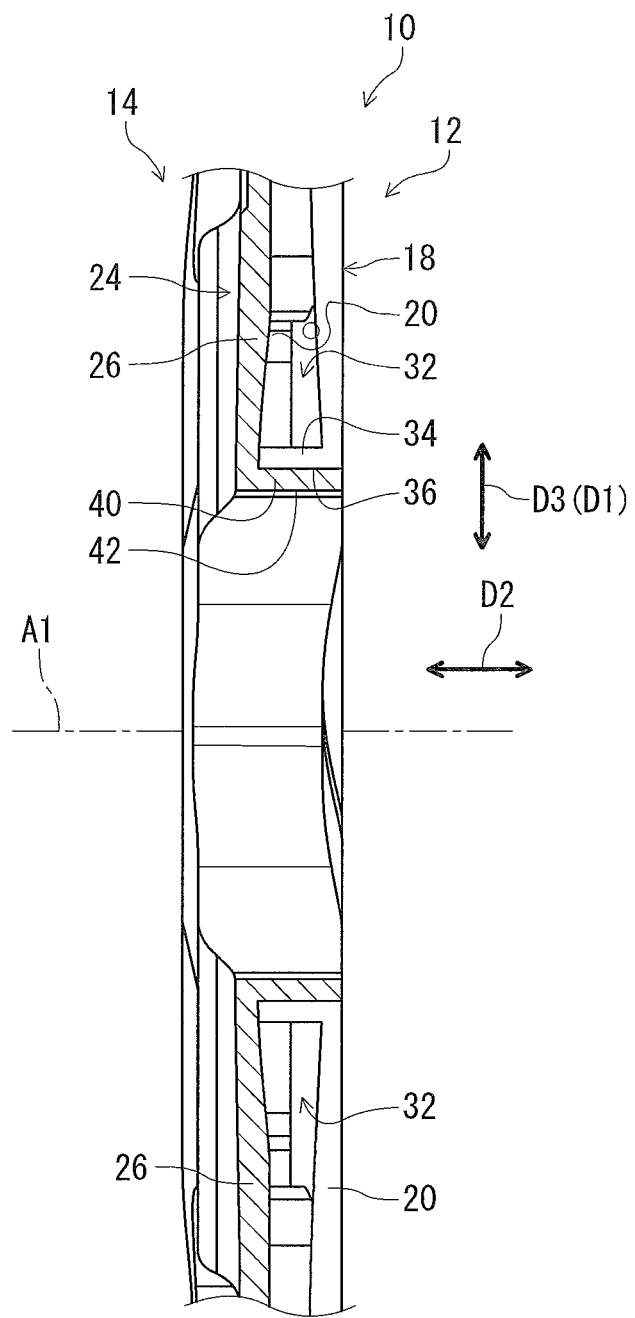
FIG. 6 is a cross-sectional view of the bicycle sprocket taken along line VI-VI of FIG. 1.

As seen in FIGS. 5 and 6, the at least one first wall 34 faces the at least one second wall 40 in the state where the second member 14 is attached to the first member 12. The at least one first wall 34 faces the at least one second wall 40 in a direction D3 parallel to a virtual plane perpendicular to the rotational axis A1 in the state where the second member 14 is attached to the first member 12. In the illustrated embodiment, the first walls 34 respectively face the second walls 40 in the state where the second member 14 is attached to the first member 12. The first walls 34 respectively faces the second walls 40 in the direction D3 parallel to the virtual plane perpendicular to the rotational axis A1 in the state where the second member 14 is attached to the first member 12. The second walls 40 are respectively provided in the first openings 36 defined by the first walls 34. In FIG. 5, the direction D3 can be defined as a radial direction of the bicycle sprocket 10. In FIG. 6, the direction D3 can be substantially defined as the circumferential direction D1 of the bicycle sprocket 10.

As seen in FIGS. 5 and 6, the at least one first wall 34 is attached to the at least one second wall 40 to couple the first member 12 to the second member 14. In the illustrated embodiment, the first walls 34 are respectively attached to the second walls 40 to couple the first member 12 to the second member 14. The first member 12 and the second member 14 are made of metallic materials, for example. More specifically, the first body 18, the first walls 34, the second body 24, and the second walls 40 are made of metallic materials. At least one of the first body 18 and the second body 24 is made of aluminum. At least one of the first walls 34 and the second walls 40 are made of aluminum. In the illustrated embodiment, the first body 18 and the second body 24 are made of aluminum. The first walls 34 and the second walls 40 are made of aluminum.

The second member 14 is attached to the first member 12 by diffusion bonding. In the illustrated embodiment, the second walls 40 are respectively attached to the first walls 34 by diffusion bonding. In the case of the second member 14 being attached to the first member 12 by diffusion bonding, the connecting line between the first member 12 and the second member 14 becomes inconspicuous. Therefore, the appearance of the bicycle sprocket 10 can be improved. The second walls 40 can, however, be attached to the first walls 34 using other attaching structures. For example, the second member 14 can be attached to the first member 12 by adhesive if needed and/or desired. In such an embodiment, the second walls 40 are respectively attached to the first walls 34 by adhesive.

As seen in FIG. 3, the plurality of first teeth 16 is separate from the first body 18 and is attached to the first body 18. In the illustrated embodiment, the first teeth 16 are integrally coupled to each other to provide an annular shape. The plurality of second teeth 22 is separate from the second body 24 and is attached to the second body 24. In the illustrated embodiment, the second teeth 22 are integrally coupled to each other to provide an annular shape.

The plurality of first teeth 16 and the plurality of second teeth 22 are made of metallic materials. At least one of the plurality of first teeth 16 and the plurality of second teeth 22 is made of one of iron, aluminum, and titanium. In the illustrated embodiment, the first teeth 16 and the second teeth 22 are made of iron.

As seen in FIG. 3, the plurality of first teeth 16 is attached to the first body 18 by diffusion bonding. The plurality of second teeth 22 is attached to the second body 24 by diffusion bonding. The first teeth 16 can, however, be attached to the first body 18 using other attaching structures. The second teeth 22 can be attached to the second body 24 using other attaching structures. For example, the plurality of first teeth 16 can be attached to the first body 18 by adhesive if needed and/or desired. The plurality of second teeth 22 can be attached to the second body 24 by adhesive if needed and/or desired.

As seen in FIG. 1, the bicycle sprocket 10 further comprises a hub mounting structure 46 configured to engage with the bicycle hub assembly (not shown). At least one of the first member 12 and the second member 14 is provided on the hub mounting structure 46. The hub mounting structure 46 is integrally provided with the at least one of the first member 12 and the second member 14.

In the illustrated embodiment, as seen in FIG. 2, the hub mounting structure 46 is integrally provided with the first member 12. The hub mounting structure 46 extends from the first body 18 of the first member 12 in the axial direction D2. The hub mounting structure 46 includes hub engaging teeth 48 configured to engage with the bicycle hub assembly (not shown).

As seen in FIGS. 3 and 5, the hub mounting structure 46 is inserted in the second additional wall 44. The hub mounting structure 46 faces the second additional wall 44 in the direction D3 parallel to the virtual plane perpendicular to the rotational axis A1 in the state where the second member 14 is attached to the first member 12. In FIGS. 3 and 5, the direction D3 can be defined as the radial direction of the bicycle sprocket 10.

The hub mounting structure 46 is preferably made of a metallic material. For example, the hub mounting structure 46 is attached to the second additional wall 44 by diffusion bonding. The hub mounting structure 46 can be attached to the second additional wall 44 by adhesive if needed and/or desired.

Figure 7:
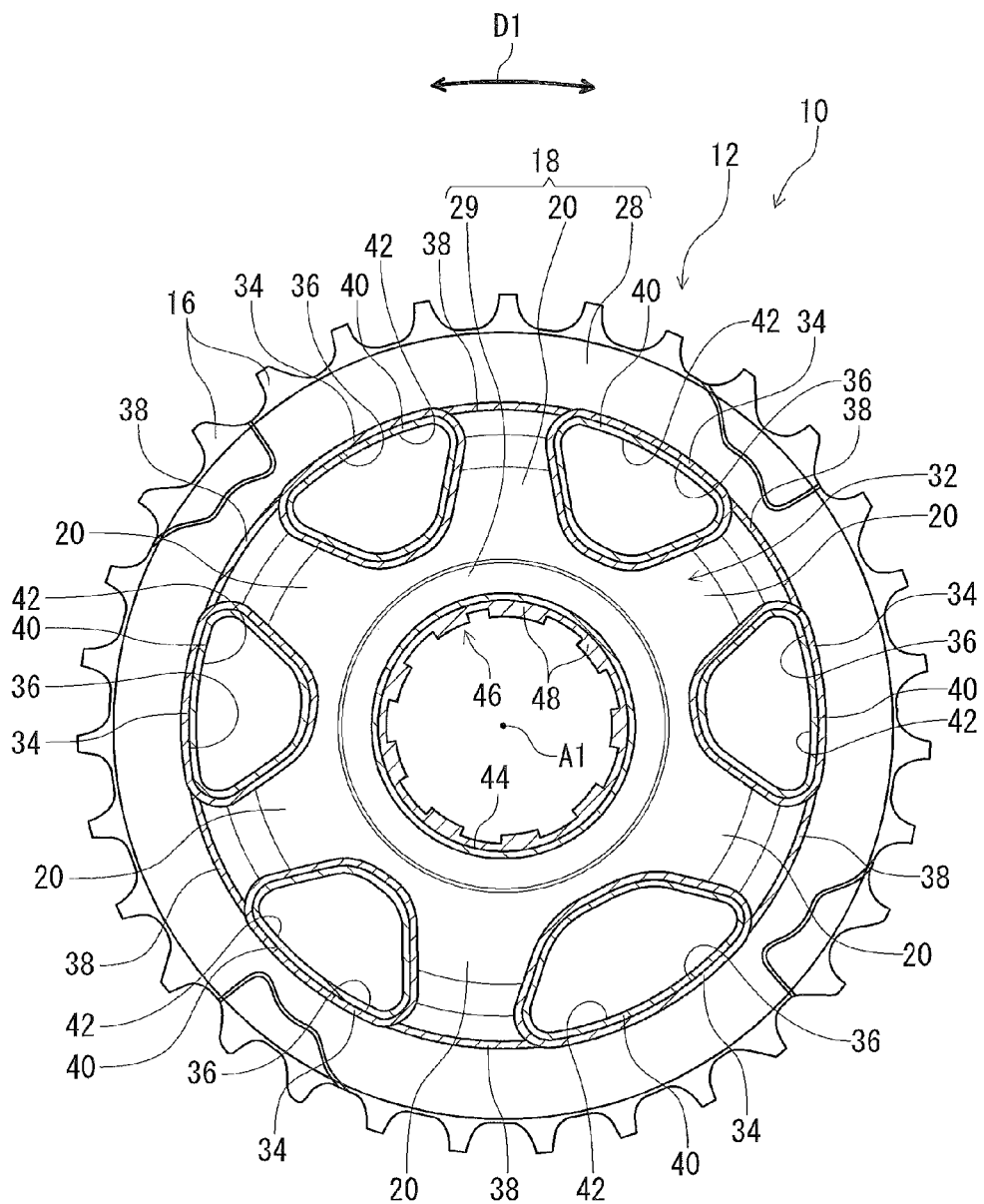
FIG. 7 is a cross-sectional view of the bicycle sprocket taken along line VII of FIG. 3.

As seen in FIGS. 3 and 7, the interior cavity 32 is a closed space defined by the first body 18, the second body 24, the second additional wall 44, the second walls 40, and the first additional walls 38. The interior cavity 32 can, however, be a partially closed space if needed and/or desired.

With the bicycle sprocket 10, the second member 14 is configured to be attached to the first member 12 so that the interior cavity 32 is provided between the first member 12 and the second member 14. The interior cavity 32 is at least partially provided between each of the first arms 20 and each of the second arms 26 in the state where the second member 14 is attached to the first member 12. Accordingly, without sacrificing rigidity, it is possible to save weight of the bicycle sprocket 10 compared with a bicycle sprocket which does not have the interior cavity 32.

Figure 8:
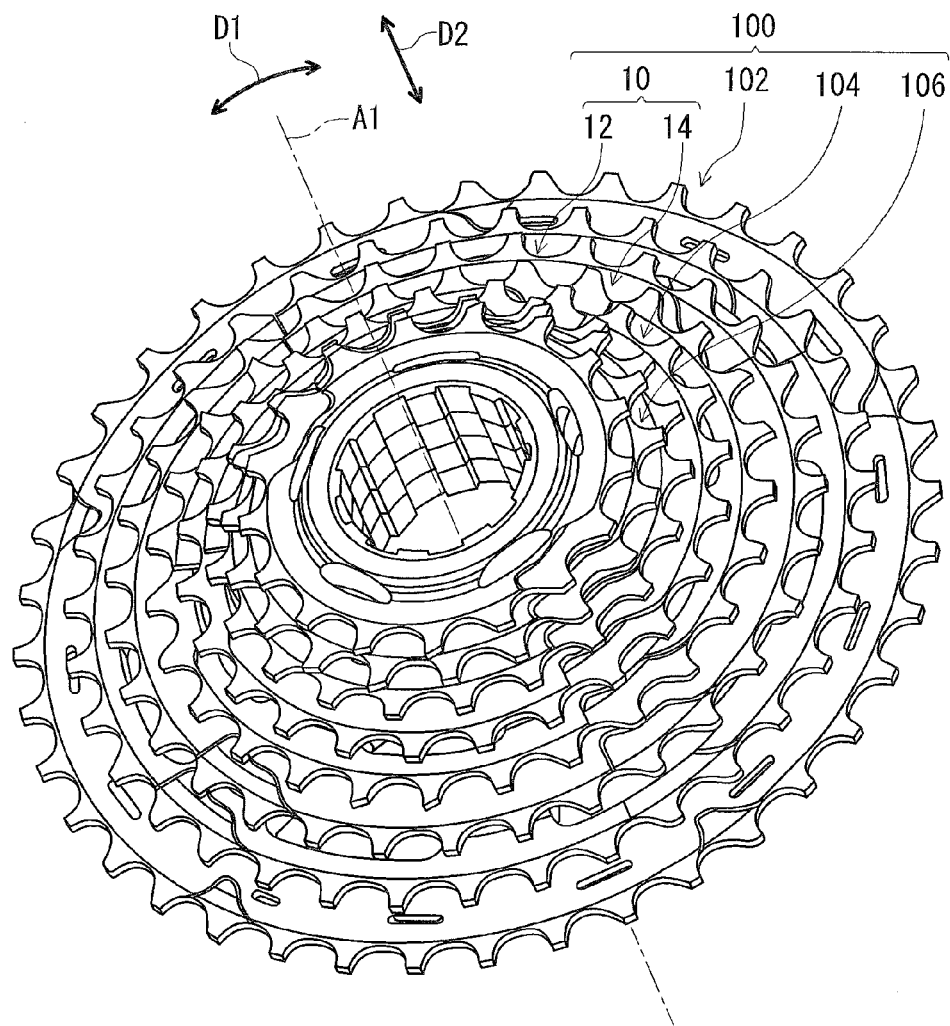
FIG. 8 is a perspective view of a cassette sprocket including the bicycle sprocket illustrated in FIG. 1.

As seen in FIG. 8, the bicycle sprocket 10 can be used as a part of a cassette sprocket 100, for example. The cassette sprocket 100 includes bicycle sprockets 102, 104 and 106 in addition to the bicycle sprocket 10. The bicycle sprockets 102, 104 and 106 are configured to engage with a bicycle hub assembly (not shown).

Figure 9:
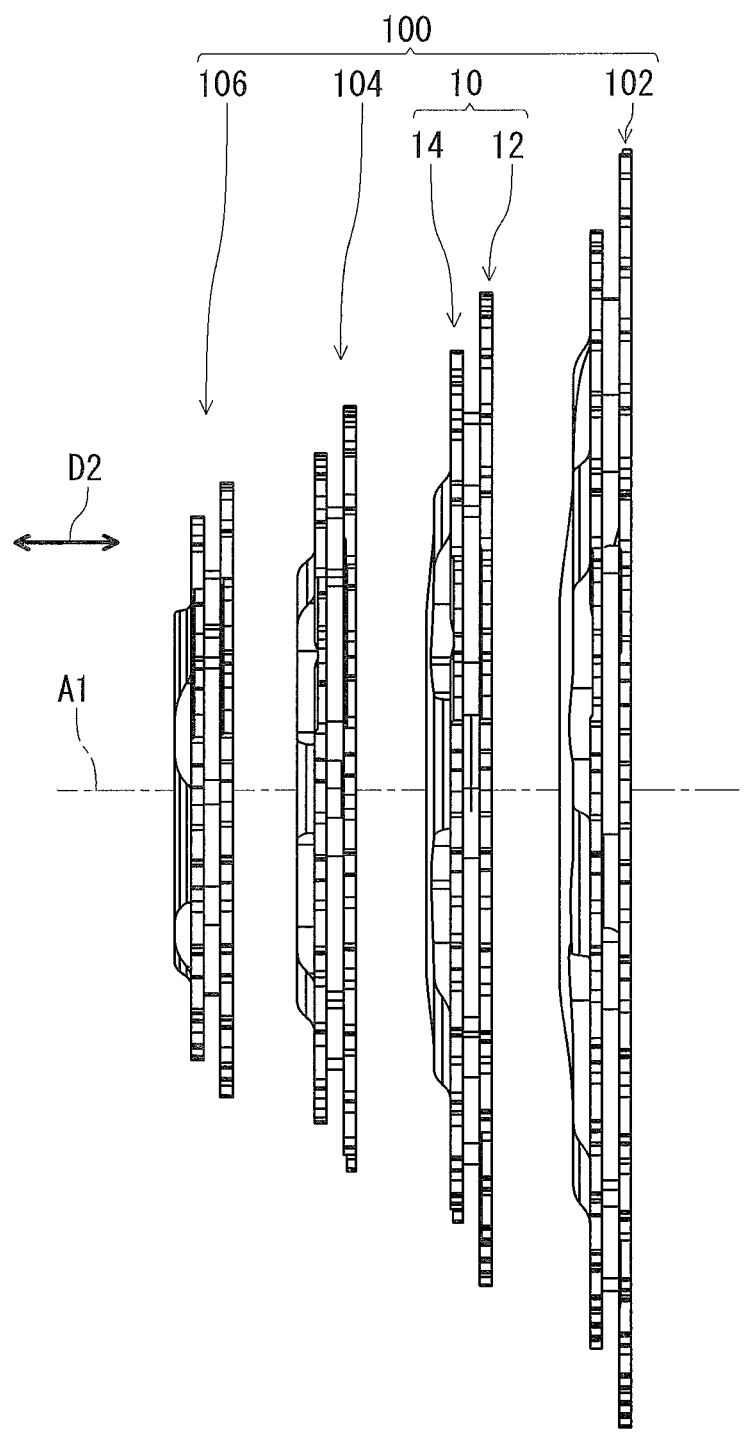
FIG. 9 is an exploded elevational view of the cassette sprocket illustrated in FIG. 8.

As seen in FIG. 9, the bicycle sprockets 10, 102, 104 and 106 are aligned in the axial direction D2 when the cassette sprocket 100 is mounted to the bicycle hub assembly. In the illustrated embodiment, the bicycle sprockets 10, 102, 104 and 106 are not coupled to each other. However, the bicycle sprockets 10, 102, 104 and 106 can be coupled to each other by attaching structures such as diffusion bonding or adhesive. Since each of the bicycle sprockets 102, 104 and 106 has substantially the same structure as the bicycle sprocket 10, they will not be described and/or illustrated in detail here for the sake of brevity.

Second Embodiment

A bicycle sprocket 210 in accordance with a second embodiment will be described below referring to FIG. 10. The bicycle sprocket 210 has the same configuration as the bicycle sprocket 10 except for the first walls 34 and the second walls 40. Thus, elements having substantially the same function as those in the first embodiment will be numbered the same here, and will not be described and/or illustrated again in detail here for the sake of brevity.

Figure 10:
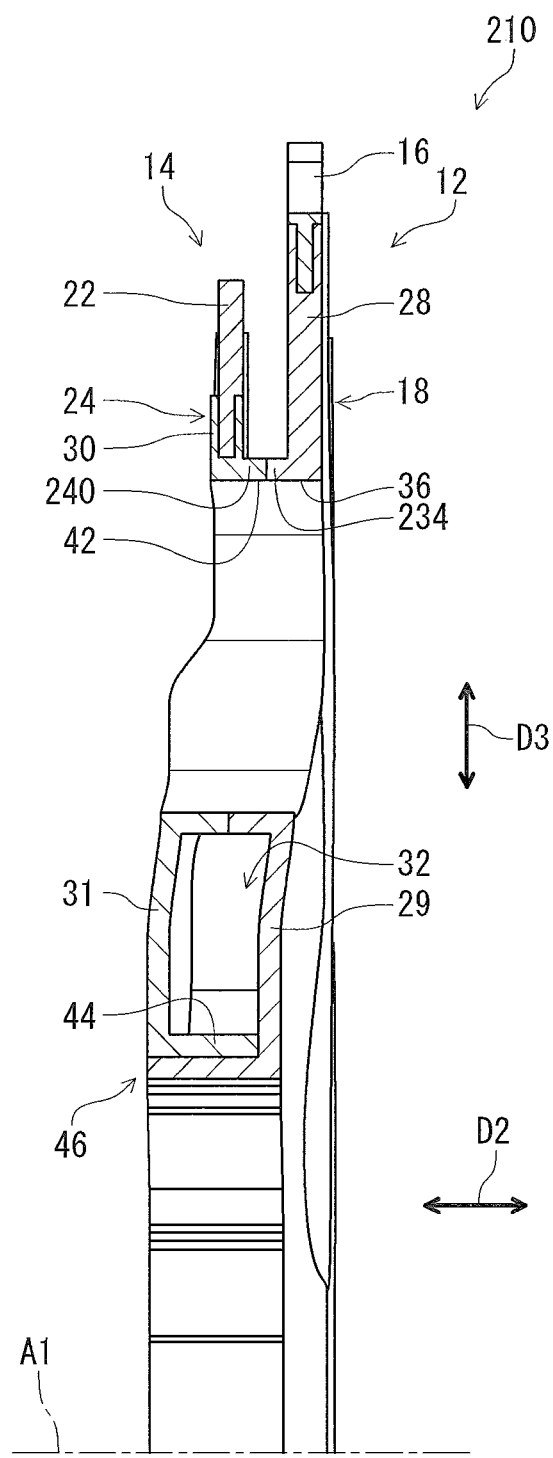
FIG. 10 is a cross-sectional view of a bicycle sprocket taken in accordance with a second embodiment.

As seen in FIG. 10, in the bicycle sprocket 210, the first member 12 includes at least one first wall 234 extending from the first body 18 in the axial direction D2. The second member 14 includes at least one second wall 240 extending from the second body 24 in the axial direction D2. In the illustrated embodiment, the first member 12 includes first walls 234 extending from the first body 18 in the axial direction D2. The second member 14 includes second walls 240 extending from the second body 24 in the axial direction D2.

The at least one first wall 234 faces the at least one second wall 240 in the state where the second member 14 is attached to the first member 12. More specifically, the at least one first wall 234 faces the at least one second wall 240 in the axial direction D2 in the state where the second member 14 is attached to the first member 12. In the illustrated embodiment, the first walls 234 respectively face the second walls 240 in the state where the second member 14 is attached to the first member 12. The first walls 234 respectively face the second walls 240 in the axial direction D2 in the state where the second member 14 is attached to the first member 12.

The at least one first wall 234 is attached to the at least one second wall 240 to couple the first member 12 to the second member 14. More specifically, an axial end of the first wall 234 is attached to an axial end of the second wall 240 to couple the first member 12 to the second member 14. For example, the first wall 234 is attached to the second wall 240 by diffusion bonding. The first wall 234 can be attached to the second wall 240 by other attaching structures such as adhesive.

With the bicycle sprocket 210, it is possible to obtain the same advantageous effect as the bicycle sprocket 10 in accordance with the first embodiment.

Third Embodiment

A bicycle sprocket 310 in accordance with a third embodiment will be described below referring to FIG. 11. The bicycle sprocket 310 has the same configuration as the bicycle sprocket 10 except for the second walls 40. Thus, elements having substantially the same function as those in the first embodiment will be numbered the same here, and will not be described and/or illustrated again in detail here for the sake of brevity.

Figure 11:
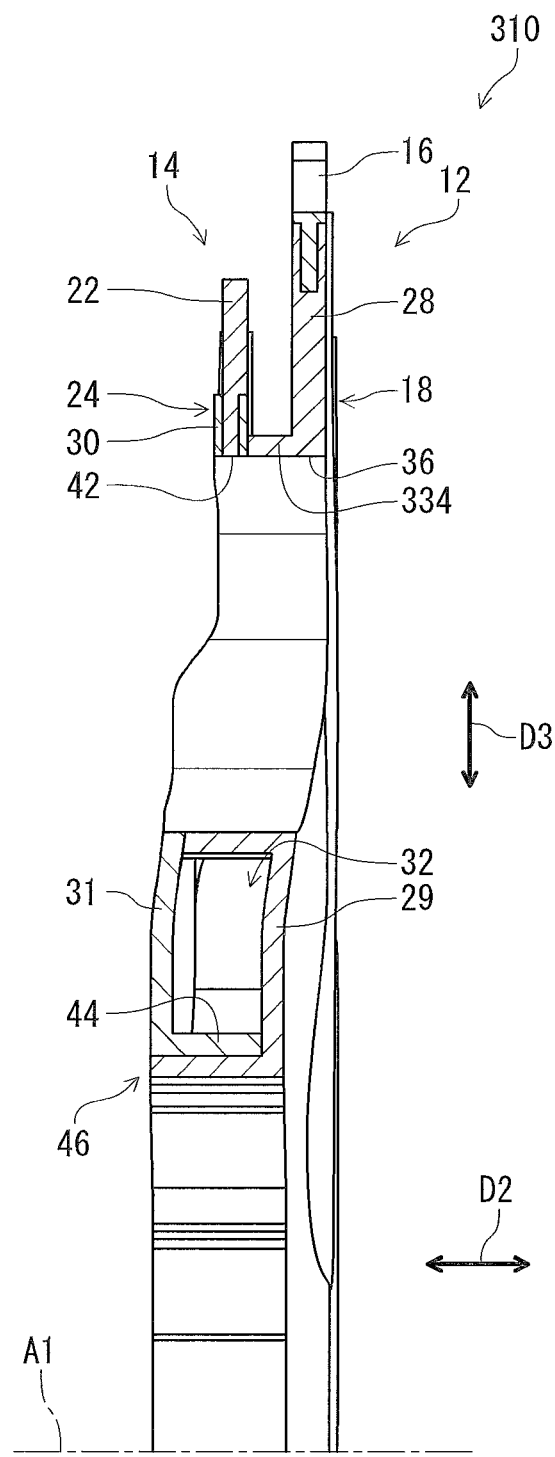
FIG. 11 is a cross-sectional view of a bicycle sprocket taken in accordance with a third embodiment.

As seen in FIG. 11, in the bicycle sprocket 310, the second walls 40 (FIG. 5) are omitted from the second member 14. The first member 12 includes at least one first wall 334 extending from the first body 18 in the axial direction D2. The at least one first wall 334 faces the second body 24 in the axial direction D2 in the state where the second member 14 is attached to the first member 12. The at least one first wall 334 is attached to the second body 24 to couple the first member 12 to the second member 14.

In the illustrated embodiment, the first member 12 includes first walls 334 instead of the first walls 34 of the bicycle sprocket 10 in accordance with the first embodiment. The first walls 334 face the second body 24 in the axial direction D2 in the state where the second member 14 is attached to the first member 12. The first walls 334 are attached to the second body 24 to couple the first member 12 to the second member 14. For example, the first walls 334 are attached to the second body 24 by diffusion bonding. The first walls 334 can be attached to the second body 24 by other bonding structures such as adhesive.

With the bicycle sprocket 310, it is possible to obtain the same advantageous effect as the bicycle sprocket 10 in accordance with the first embodiment.

Fourth Embodiment

A bicycle sprocket 410 in accordance with a fourth embodiment will be described below referring to FIG. 12. The bicycle sprocket 410 has the same configuration as the bicycle sprocket 10 except for the first walls 34. Thus, elements having substantially the same function as those in the first embodiment will be numbered the same here, and will not be described and/or illustrated again in detail here for the sake of brevity.

Figure 12:
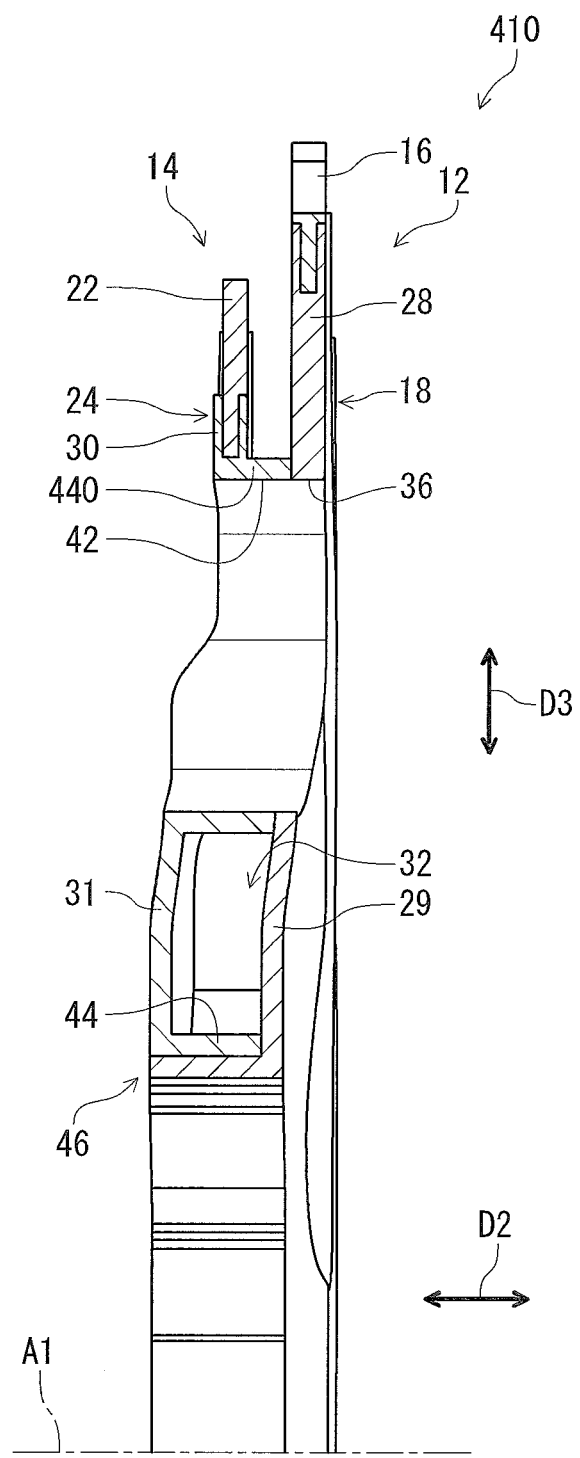
FIG. 12 is a cross-sectional view of a bicycle sprocket taken in accordance with a fourth embodiment.

As seen in FIG. 12, in the bicycle sprocket 410, the first walls 34 (FIG. 5) are omitted from the first member 12. The second member 14 includes at least one second wall 440 extending from the second body 24 in the axial direction D2. The at least one second wall 440 faces the first body 18 in the axial direction D2 in the state where the second member 14 is attached to the first member 12. The at least one second wall 440 is attached to the first body 18 to couple the first member 12 to the second member 14.

In the illustrated embodiment, the second member 14 includes second walls 440 instead of the second walls 40 of the bicycle sprocket 10 in accordance with the first embodiment. The second walls 440 face the first body 18 in the axial direction D2 in the state where the second member 14 is attached to the first member 12. The second walls 440 are attached to the first body 18 to couple the first member 12 to the second member 14. For example, the second walls 440 are attached to the first body 18 by diffusion bonding. The second walls 440 can be attached to the first body 18 by other attaching structures such as adhesive.

With the bicycle sprocket 410, it is possible to obtain the same advantageous effect as the bicycle sprocket 10 in accordance with the first embodiment.

Fifth Embodiment

A bicycle sprocket 510 in accordance with a fifth embodiment will be described below referring to FIG. 13. The bicycle sprocket 510 has the same configuration as the bicycle sprocket 10 except for the first teeth 16 and the second teeth 22. Thus, elements having substantially the same function as those in the first embodiment will be numbered the same here, and will not be described and/or illustrated again in detail here for the sake of brevity.

Figure 13:
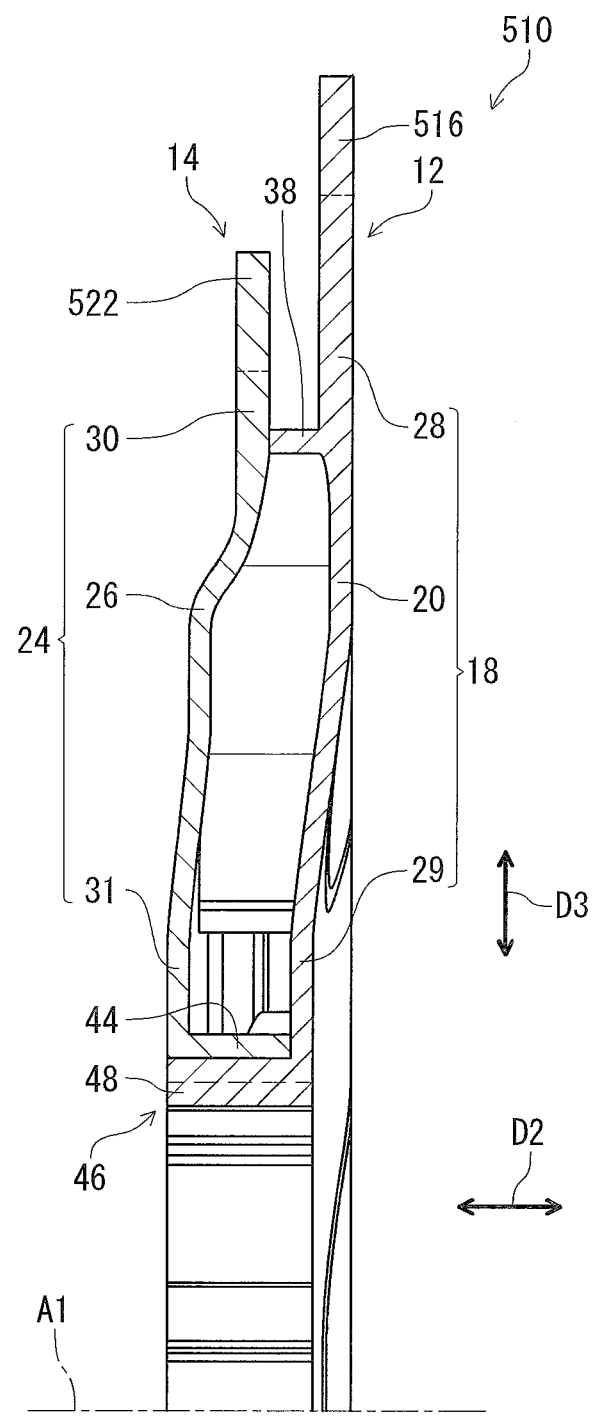
FIG. 13 is a cross-sectional view of a bicycle sprocket taken in accordance with a fifth embodiment.

As seen in FIG. 13, in the bicycle sprocket 510, the first member 12 comprises a plurality of first teeth 516. The plurality of first teeth 516 is integrally provided with the first body 18 as a single unitary member. The second member 14 comprises a plurality of second teeth 522. The plurality of second teeth 522 is integrally provided with the second body 24 as a single unitary member. For example, the first teeth 516 and the first body 18 are made of a metallic material such as iron, aluminum or titanium. The second teeth 522 and the second body 24 are made of a metallic material such as iron, aluminum or titanium.

With the bicycle sprocket 510, it is possible to obtain the same advantageous effect as the bicycle sprocket 10 in accordance with the first embodiment.

Sixth Embodiment

A bicycle sprocket 610 in accordance with a sixth embodiment will be described below referring to FIG. 14. The bicycle sprocket 610 has the same configuration as the bicycle sprocket 10 except for the first teeth 16 and the second teeth 22. Thus, elements having substantially the same function as those in the first embodiment will be numbered the same here, and will not be described and/or illustrated again in detail here for the sake of brevity.

Figure 14:
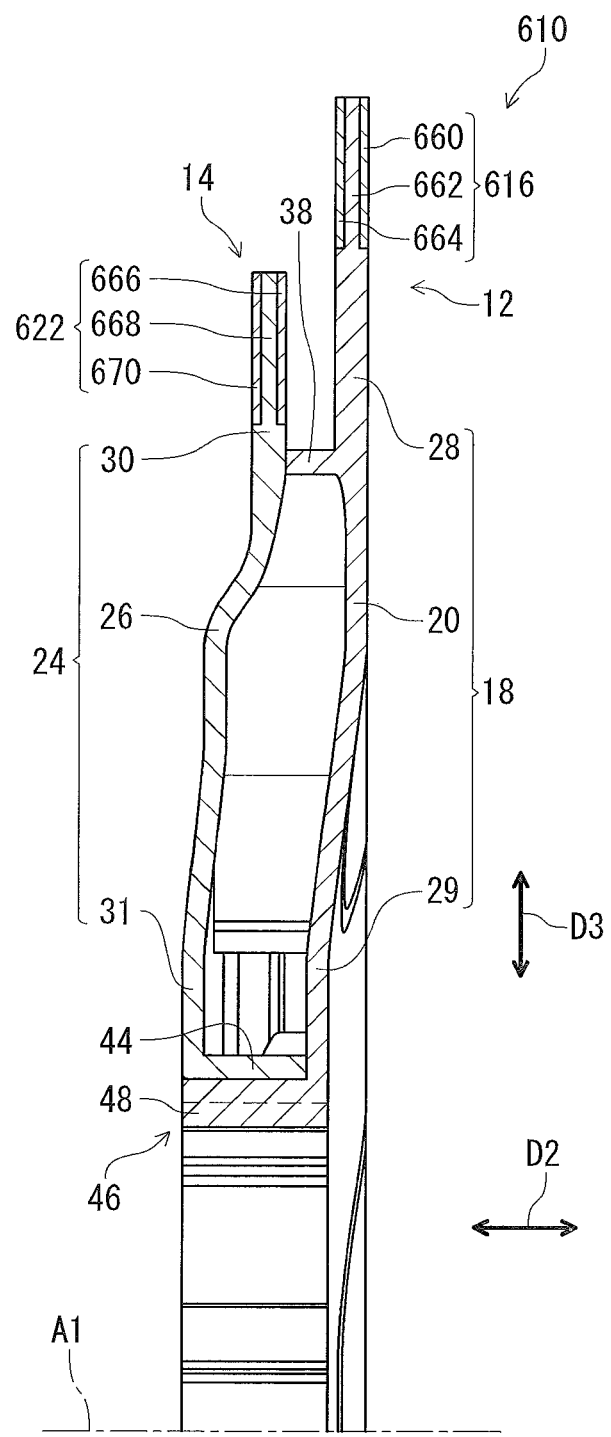
FIG. 14 is a cross-sectional view of a bicycle sprocket taken in accordance with a sixth embodiment.

As seen in FIG. 14, the first member 12 comprises a plurality of first teeth 616. The plurality of first teeth 616 has a multi-layered structure. The plurality of first teeth 616 includes a first layer 660, a second layer 662, and a third layer 664. The first layer 660 is made of a first metallic material having a first density. The second layer 662 is made of a second metallic material having a second density. The third layer 664 is made of a third metallic material having a third density. The second layer 662 is provided between the first layer 660 and the third layer 664. The second density is lower than the first density and the third density.

For example, the first metallic material comprises one of iron and titanium. The third metallic material comprises one of iron and titanium. The second metallic material comprises aluminum as well as the first body 18. The second layer 662 is integrally provided with the first body 18. For example, the first layer 660 and the third layer 664 are attached to the second layer 662 by diffusion bonding. The first layer 660 and the third layer 664 can be attached to the second layer 662 using other attaching structures such as adhesive.

The second member 14 comprises a plurality of the second teeth 622. The plurality of second teeth 622 has a multi-layered structure. The plurality of second teeth 622 includes a fourth layer 666, a fifth layer 668, and a sixth layer 670. The fourth layer 666 is made of a fourth metallic material having a fourth density. The fifth layer 668 is made of a fifth metallic material having a fifth density. The sixth layer 670 is made of a sixth metallic material having a sixth density. The fifth layer 668 is provided between the fourth layer 666 and the sixth layer 670. The fifth density is lower than the fourth density and the sixth density.

For example, the fourth metallic material comprises one of iron and titanium. The sixth metallic material comprises one of iron and titanium. The fifth metallic material comprises aluminum as well as the second body 24. The fifth layer 668 is integrally provided with the second body 24. The fourth layer 666 and the sixth layer 670 are attached to the fifth layer 668 by diffusion bonding. The fourth layer 666 and the sixth layer 670 can be attached to the fifth layer 668 using other attaching structures such as adhesive.

With the bicycle sprocket 610, it is possible to obtain the same advantageous effect as the bicycle sprocket 10 in accordance with the first embodiment.

Seventh Embodiment

A bicycle sprocket 710 in accordance with a seventh embodiment will be described below referring to FIG. 15. The bicycle sprocket 710 has the same configuration as the bicycle sprocket 10 except for the hub mounting structure 46. Thus, elements having substantially the same function as those in the first embodiment will be numbered the same here, and will not be described and/or illustrated again in detail here for the sake of brevity.

Figure 15:
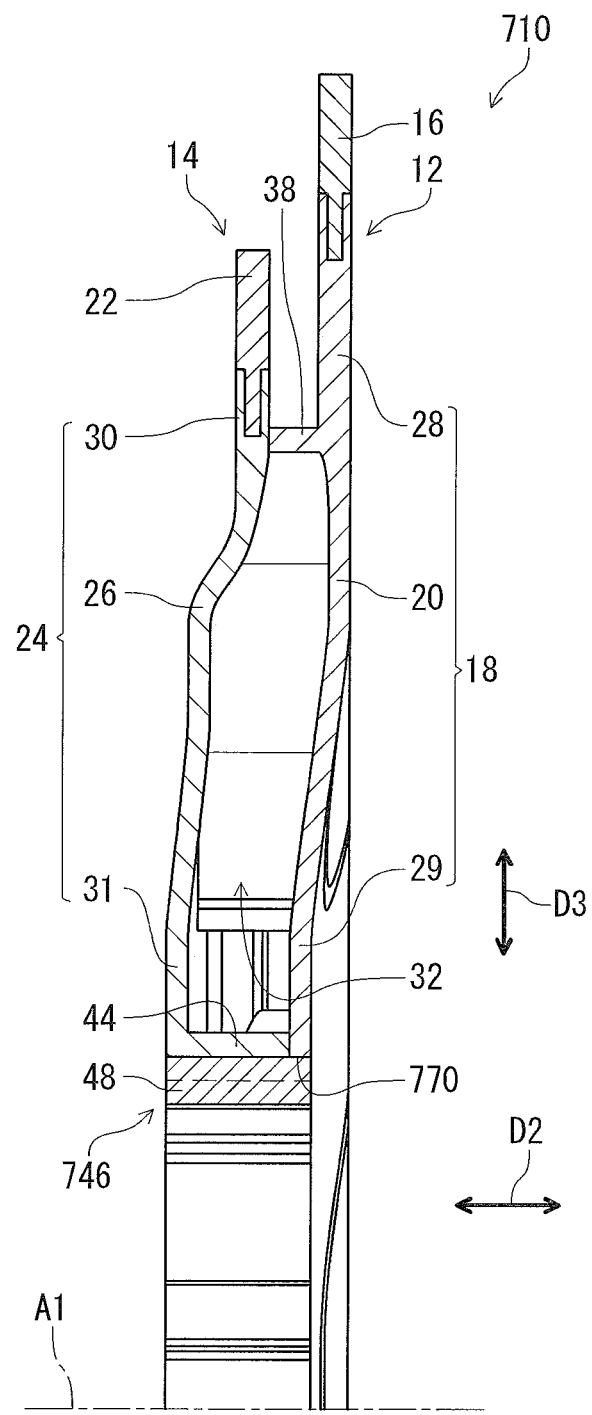
FIG. 15 is a cross-sectional view of a bicycle sprocket taken in accordance with a seventh embodiment.

As seen in FIG. 15, the bicycle sprocket 710 comprises a hub mounting structure 746 configured to engage with a bicycle hub assembly (not shown). At least one of the first member 12 and the second member 14 is provided on the hub mounting structure 746. The hub mounting structure 746 has substantially the same shape as the hub mounting structure 46. The hub mounting structure 746 is separate from the at least one of the first member 12 and the second member 14 and is attached to the at least one of the first member 12 and the second member 14. In the illustrated embodiment, the hub mounting structure 746 is separate from the first member 12 and the second member 14 and is attached to the first member 12 and the second member 14. More specifically, the hub mounting structure 746 is provided in the second additional wall 44 of the second member 14. The first body 18 includes a first center opening 770. The hub mounting structure 746 is provided in the first center opening 770. The hub mounting structure 746 is preferably made of a metallic material and is attached to the first member 12 and the second member 14 by diffusion bonding. The hub mounting structure 746 can be attached to the first member 12 and the second member 14 using other attaching structures such as adhesive.

With the bicycle sprocket 710, it is possible to obtain the same advantageous effect as the bicycle sprocket 10 in accordance with the first embodiment.

In the present application, the term "attached" or "attaching", as used herein, can encompass configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a first member comprising a plurality of first teeth and a first body, the first body including a plurality of first arms arranged in a circumferential direction of the bicycle sprocket; and
   a second member comprising a plurality of second teeth and a second body, the second body including a plurality of second arms arranged in the circumferential direction, the second member being configured to be attached to the first member so that an interior cavity is provided between the first member and the second member, at least one of the second arms being spaced apart from at least one of the first arms in an axial direction parallel to a rotational axis of the bicycle sprocket to provide the interior cavity at least partly between the at least one of the first arms and at least one of the second arms in the axial direction in a state where the second member is attached to the first member.

2. The bicycle sprocket according to claim 1, wherein
   the first body including a first outer peripheral part,
   the plurality of first teeth radially outwardly protrudes from the first outer peripheral part of the first body,
   the second body including a second outer peripheral part,
   the plurality of second teeth radially outwardly protrudes from the second outer peripheral part of the second body, and
   the second body faces the first body and spaced apart from the first body in an axial direction parallel to a rotational axis of the bicycle sprocket.

3. The bicycle sprocket according to claim 2, wherein
   the first member includes at least one first wall extending from the first body in the axial direction,
   the second member includes at least one second wall extending from the second body in the axial direction, and
   the at least one first wall faces the at least one second wall in the state where the second member is attached to the first member.

4. The bicycle sprocket according to claim 3, wherein
   the at least one first wall is adjacent to the at least one second wall without another wall between the at least one first wall and the at least one second wall in a direction parallel to a virtual plane perpendicular to the rotational axis in the state where the second member is attached to the first member.

5. The bicycle sprocket according to claim 3, wherein the at least one first wall is adjacent to the at least one second wall in the axial direction in the state where the second member is attached to the first member.

6. The bicycle sprocket according to claim 3, wherein the at least one first wall is attached to the at least one second wall to couple the first member to the second member.

7. The bicycle sprocket according to claim 2, wherein the first member includes at least one first wall extending from the first body in the axial direction, and the at least one first wall faces the second body in the axial direction in the state where the second member is attached to the first member.

8. The bicycle sprocket according to claim 7, wherein the at least one first wall is attached to the second body to couple the first member to the second member.

9. The bicycle sprocket according to claim 2, wherein the second member includes at least one second wall extending from the second body in the axial direction, and the at least one second wall is adjacent to the first body in the axial direction in the state where the second member is attached to the first member.

10. The bicycle sprocket according to claim 9, wherein the at least one second wall is attached to the first body to couple the first member to the second member.

11. The bicycle sprocket according to claim 1, wherein the plurality of first teeth is integrally provided with the first body as a single unitary member.

12. The bicycle sprocket according to claim 1, wherein the plurality of second teeth is integrally provided with the second body as a single unitary member.

13. The bicycle sprocket according to claim 1, wherein the plurality of first teeth is separate from the first body and attached to the first body.

14. The bicycle sprocket according to claim 1, wherein the plurality of second teeth is separate from the second body and attached to the second body.

15. The bicycle sprocket according to claim 1, wherein the plurality of first teeth has a multi-layered structure, the plurality of first teeth includes
a first layer made of a first metallic material having a first density,
a second layer made of a second metallic material having a second density, and
a third layer made of a third metallic material having a third density,
the second layer is provided between the first layer and the third layer, and
the second density is lower than the first density and the third density.

16. The bicycle sprocket according to claim 1, wherein the plurality of second teeth has a multi-layered structure, the plurality of second teeth includes
a fourth layer made of a fourth metallic material having a fourth density,
a fifth layer made of a fifth metallic material having a fifth density, and
a sixth layer made of a sixth metallic material having a sixth density,
the fifth layer is provided between the fourth layer and the sixth layer, and
the fifth density is lower than the fourth density and the sixth density.

17. The bicycle sprocket according to claim 1, further comprising:
a hub mounting structure configured to engage with a bicycle hub assembly, wherein
at least one of the first member and the second member is provided on the hub mounting structure.

18. The bicycle sprocket according to claim 17, wherein the hub mounting structure is integrally provided with the at least one of the first member and the second member.

19. The bicycle sprocket according to claim 17, wherein the hub mounting structure is separate from the at least one of the first member and the second member and is attached to the at least one of the first member and the second member.

20. The bicycle sprocket according to claim 1, wherein the second member is attached to the first member by diffusion bonding.

21. The bicycle sprocket according to claim 1, wherein the second member is attached to the first member by adhesive.

22. The bicycle sprocket according to claim 1, wherein the plurality of first teeth is attached to the first body by diffusion bonding.

23. The bicycle sprocket according to claim 1, wherein the plurality of second teeth is attached to the second body by diffusion bonding.

24. The bicycle sprocket according to claim 1, wherein the plurality of first teeth is attached to the first body by adhesive.

25. The bicycle sprocket according to claim 1, wherein the plurality of second teeth is attached to the second body by adhesive.

26. The bicycle sprocket according to claim 1, wherein the first member includes first openings provided between the first arms in the circumferential direction, and the second member includes second openings provided between the second arms in the circumferential direction.

27. The bicycle sprocket according to claim 26, wherein the first openings are respectively aligned with the second openings in the axial direction in the state where the second member is attached to the first member.

28. The bicycle sprocket according to claim 1, wherein at least one of the plurality of first teeth and the plurality of second teeth is made of one of iron, aluminum, and titanium.

29. The bicycle sprocket according to claim 1, wherein at least one of the first body and the second body is made of aluminum.

30. The bicycle sprocket according to claim 1, wherein the interior cavity is at least partially provided between each of the first arms and each of the second arms in the state where the second member is attached to the first member.

* * * * *